United States Patent Office
3,294,777
Patented Dec. 27, 1966

3,294,777
PRODUCTION OF HETEROCYCLIC AZO DYES
Guenter Hansen, Johannes Dehnert, and Hans Baumann, all of Ludwigshafen (Rhine), Germany, assignors to Badische Anilin- & Soda-Fabrik Aktiengesellschaft, Ludwigshafen (Rhine), Germany
No Drawing. Filed Nov. 19, 1964, Ser. No. 412,339
Claims priority, application Germany, Nov. 23, 1963, B 74,374
6 Claims. (Cl. 260—157)

This invention relates to a process for the production of azo dyes which can be converted by alkylation into basic azo dyes, and to azo dyes obtained by the said process.

Some of the azo dyes obtainable according to this invention may be obtained by other methods which are already known.

Conventional diazotization of appropriate heterocyclic amines and coupling with arylamines is in many cases not possible for the production of the dyes obtainable according to this invention because the amines cannot be diazotized or can only be manufactured with difficulty or are unstable. It has therefore been proposed, in the case of heterocylic amines which cannot be diazotized, for example 2-aminobenzimidazole, to prepare the azo dyes by condensation with p-dialkylaminonitrosobenzenes. This method, however, gives relatively low yields and requires reaction conditions which are difficult to apply industrially.

It is an object of the present invention to provide a process permitting the production in a simple way of heterocyclic azo dyes which contain a thiazole and particularly an imidazole radical.

We have found that dyes having the formula:

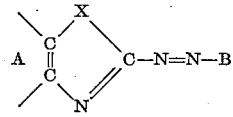

in which X denotes a group selected from the class consisting of —S—, —NH—,

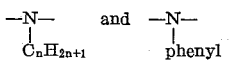

A denotes a divalent group which, together with the two free valencies, forms a six-membered aromatic ring, and B denotes the radical of a diazotizable amine of the benzene series, are obtained in a simple way by reacting a compound having the formula:

D—N=N—B    II in which B has the meaning given above and D denotes a group selected from the class consisting of:

and R denotes a radical of the benzene series, with a compound having the formula:

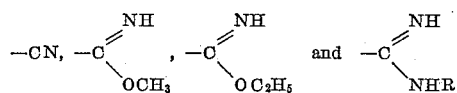

in which X and A have the meanings given above.

According to a preferred embodiment of the reaction according to this invention, dyes having the formula:

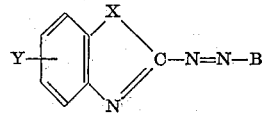

in which Y denotes hydrogen, chlorine, bromine, methyl, methoxy, ethoxy or acetylamino and X and B have the meanings given above are obtained by reacting a compound having the formula:

D—N=N—B    II with a compound having the formula:

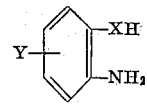

at 10° to 150° C., D, B, Y and X having the meanings given above.

The compounds thus obtained may then be converted by conventional methods by alkylation into the corresponding basic azo dyes, i.e. diazastyryl dyes.

Particularly suitable compounds having the general Formula II are those having the general formula

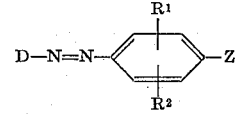

of which the diazo cyanides are preferred. In the said formula $R_1$ denotes a member selected from the class consisting of a hydrogen atom, a methyl group, a methoxy group and an ethoxy group, $R_2$ denotes a member selected from the class consisting of a hydrogen atom, a chlorine atom and a methoxy group and Z denotes a member selected from the class consisting of a hydrogen atom, a chlorine atom, a bromine atom, a nitro group, a methoxy group, an ethoxy group, an acetylamino group, a carboxyl group, a monosubstituted amino group and a disubstituted amino group. Examples of disubstituted amino groups are dialkylamino groups and the alkyl radicals may bear chlorine atoms, hydroxyl groups, other amino groups or phenyl radicals as substituents. Dialkylamino groups thus include pyrrolidino, piperidino, morpholino and N-formyl-N'-piperazino radicals. When Z denotes a chlorine atom, a bromine atom, a methoxy group or an ethoxy group, dyes are obtained having the formula:

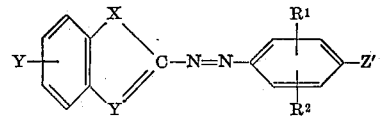

in which X, Y, $R^1$ and $R^2$ have the meanings given above. These dyes may be converted, for example by the method of U.S. patent specification No. 3,102,878, into basic azo dyes which are outstandingly suitable for dyeing polyacrylonitrile.

The following may be given as specific examples of compounds having the Formulae II and IV:

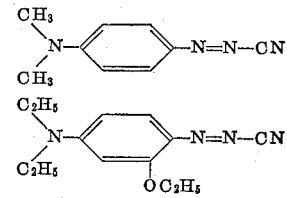

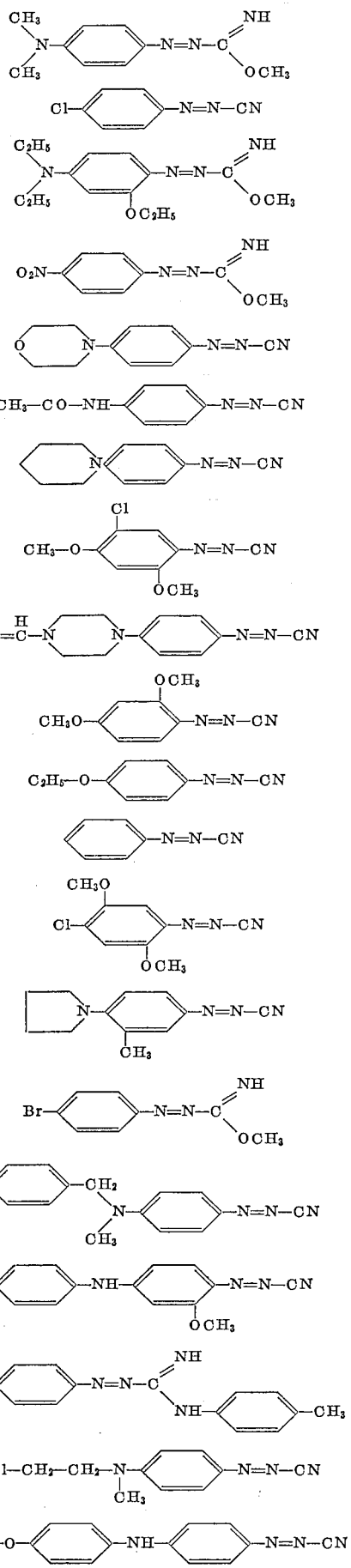
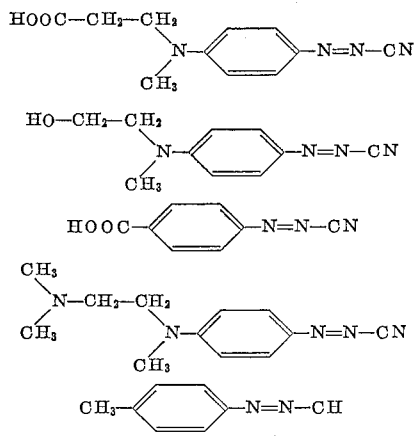

Most of these compounds are known. The remaining compounds are prepared in analogous ways.

Examples of compounds having the general Formula III are: 1,2 - diaminobenzene, 1 - amino - 2 - methyl-aminobenzene, 2 - aminodiphenylamine, 4 - methyl - 1,2-diaminobenzene, 4 - methoxy - 1,2 - diaminobenzene, 4-chloro - 1,2 - diaminobenzene, 2 - aminothiophenol and other compounds bearing —Br, —OC$_2$H$_5$ or

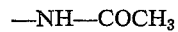

as substituents.

Condensation of the compounds having the general Formula II with the compounds having the general Formula III may be carried out with or without the use of a solvent or diluent. Examples of solvents and diluents are: chlorobenzene, o-dichlorobenzene, dioxane, alcohol, water and mixtures of these. In some cases it is advantageous to add inorganic or organic acids.

If the reaction be carried out without solvents, the compounds having the Formula II, particularly diazo cyanides, may be introduced into a melt of the compounds having the Formula III, for example at 100° C. The heat of reaction liberated causes a rise in temperature, as a rule to about 130° C. The whole is then further heated for a short time, for example forty-five minutes, and the reaction product is isolated by a conventional method. It is possible, however, to carry out further reactions immediately in the same vessel. For example the melt may be cooled, taken up in chloroform and the dye obtained by condensation may be alkylated to form a basic dye.

In the case of the most reactive components, i.e. compounds having the Formula II in which D denotes the radical of an iminoether, the reaction takes place at room temperature, for example from 10° to 30° C., and in other cases heating to 100° to 150° C., preferably 100° to 130° C., is advisable. Condensation as a rule proceeds very rapidly so that heating for fifteen minutes to ninety minutes is usually sufficient.

The relative proportions of the compounds having Formulae II and III may deviate slightly, for example 10%, from the stoichiometric ratio. To achieve good yields, it has proved to be particularly advantageous to use an excess of component having the Formula III.

The condensation products obtained may be isolated in the usual way, for example by suction filtration.

The azo dyes obtainable according to the invention are as a rule intermediates which yield valuable dyes by further reaction. For example if condensation products having the Formula I in which B bears an unsubstituted or substituted amino group in p-position to the azo bridge be alkylated, basic azo dyes are obtained which are outstandingly suitable for dyeing polyacrylonitrile. Furthermore compounds having the Formula I which have not previously been described in the literature in which B bears a substituent, namely a halogen atom or an alkoxy group, in p-position to the azo bridge, may be converted after quaternization by the process according to U.S. patent specification No. 3,102,878 into valuable basic dyes for dyeing polyacrylonitrile.

The non-alkylated dyes are suitable in many cases in solution or suspension for dyeing and printing textiles, for example mordanted cotton, leather and materials, such as fibers, flock, filaments, threads, film, sheeting or spun goods of cellulose esters or ethers, or of synthetic substances, such as polyamides, polyurethanes or polyesters; in some cases these dyes also yield useful dyeings and prints on materials of polyacrylonitrile or copolymers containing acrylonitrile.

The condensation products may be isolated and then reacted with alkylating agents to alkylate them. It is advantageous however to alkylate the condensation products immediately after condensation in the same reactor and without isolation.

Alkylation of the condensation products having the Formula I may be carried out without solvents or in the presence of solvents or diluents, preferably chloroform, at temperatures of from 20° to 150° C., with or without the addition of acid-binding agents, such as magnesium oxide, sodium methylate or dimethylformamide.

Examples of alkylating agents are diethyl sulfate, methyl, ethyl and p-chloroethyl toluenesulfonates, methyl iodide, butyl bromide and particularly dimethyl sulfate.

Dyes obtained by alkylation may be converted into salts having any desired anions by double decomposition.

Any anions of simple and complex acids are suitable, for example $Cl^-$, $Br^-$, $SO_4^{--}$, $PO_4^{---}$, $ClO_4^-$, $BF_4^-$, $Cr_2O_7^{--}$, $CH_3COO^-$, $CH_3SO_4^-$, $C_6H_5\text{-}SO_3^-$, $ZnCl_4^{--}$ and $ZnBr_4^{--}$.

The invention is further illustrated by the following examples in which parts and percentages are by weight, unless stated otherwise. Parts by volume bear the same relation to parts by weight as the liter (S.T.P.) to the kilogram.

EXAMPLE 1

49 parts of 2-ethoxy-4-diethylaminophenyl diazo cyanide is united with 27 parts of finely powdered 1,2-diaminobenzene, the mixture is ground with 200 parts of water and 200 parts of 36% hydrochloric acid is allowed to flow in, so that the mixture becomes hot. The mixture is then boiled, reaction thus being initiated. During the course of the reaction, which lasts for about three to ten minutes, the diazo cyanide passes into solution. After the reaction is over, 500 parts of saturated sodium chloride solution and then 200 parts of 50% zinc chloride solution are allowed to flow into the reaction mixture. The deposited dye having the formula:

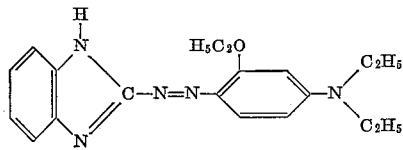

is suction filtered, washed with sodium chloride solution and dried. It dissolves in alcohol with a red coloration and dyes acetate cloth claret shades.

*Quaternization*

The dye obtained as above is heated to 50° to 60° C. with 1000 parts by volume of chloroform. 8 parts of magnesium oxide and 38 parts of dimethyl sulfate are added and the whole is stirred at 50° to 60° C. until methylation is completed. This may be determined, for example, by paper chromatography. The chloroform is then distilled off and at the same time 300 parts of 10% aqueous acetic acid is added. The solution is cooled and 300 parts of saturated sodium chloride solution and 40 parts of 50% zinc chloride solution are added. The precipitated dye having the formula:

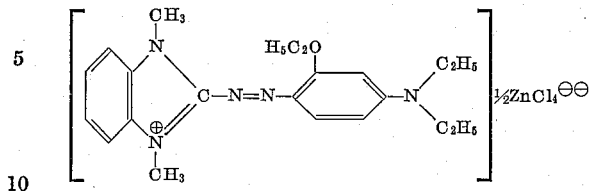

is suction filtered, washed with a little sodium chloride solution and dried at 70° C. A blue black powder is obtained which dissolves in water with a red violet coloration and dyes polyacrylonitrile cloth red violet shades from an acetic acid or sulfuric acid liquor. The dyeings thus obtained have outstanding wet fastness and light fastness.

By using 28 parts of 4-methyl-1,2-diaminobenzene or 34 parts of 4-chloro-1,2-diaminobenzene instead of 27 parts of 1,2-diaminobenzene and reacting the resultant dye in the manner described above, dyes having similar tinctorial properties are obtained.

EXAMPLE 2

13 parts of finely powdered 1,2-diaminobenzene is introduced into 60 parts of o-dichlorobenzene and the mixture is heated to 100° C. while stirring. 17.4 parts of 4-dimethylaminophenyl azo cyanide is then added in portions, the temperature of the mixture thus rising to 130° C. without further heat being supplied. The whole is stirred for about fifteen minutes at 100° C., cooled and the dye having the formula:

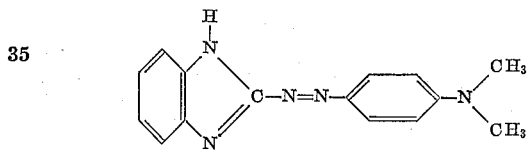

formed is suction filtered.

The dye is dried and a blue black powder is obtained which dissolves in alcohol with a cherry red coloration and is soluble in mineral acids with a red violet color.

*Quaternization*

The whole of the dye obtained is dissolved in 100 parts by volume of chloroform and, after 10 parts of magnesium oxide has been added, the whole is heated to 50° to 60° C. 26 parts by volume of dimethyl sulfate is allowed to flow in and the mixture is stirred for one hour at 50° to 60° C. and then worked up as described in Example 1. The product is isolated and dried. A dye having the formula:

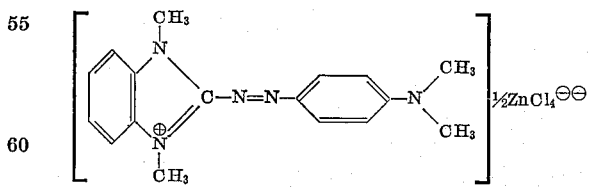

is obtained as a dark powder which dissolves in water and dyes polyacrylonitrile cloth red violet shades from an acetic acid or sulfuric acid liquor. The shades are more bathochromic than those obtained with the dye of Example 1. The dyeings have not only excellent wet fastness and light fastness but also outstanding thermal fastness.

By proceeding as described in the first paragraph of this example but omitting the use of o-dichlorobenzene as a solvent and the isolation of the dye formed, and working the product up as described above, the same dye is obtained in the same degree of purity and in an even better yield.

By using 14.6 parts of 1-methylamino-2-aminobenzene instead of the 13 parts of 1,2-diaminobenzene in the first paragraph of this example, and otherwise adopting the above procedure, the same dye is obtained.

By using 21.7 parts of 2-aminodiphenylamine instead of the 13 parts of 1,2-diaminobenzene in the first paragraph of this example and methylating the product, a violet dye having similar tinctorial fastness is obtained.

EXAMPLE 3

13.8 parts of 1-mercapto-2-aminobenzene are gradually added to a solution of 17.4 parts of 4-dimethylaminophenyl azo cyanide in 100 parts by volume of chloroform while stirring, intense red coloration and a rise in temperature of the reaction mixture thus taking place. When disengagement of heat has ceased, the whole is stirred for another hour at 50° to 60° C. to complete the reaction. To quaternize the dye having the formula:

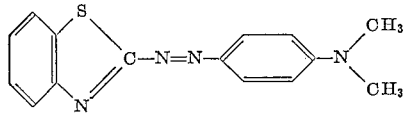

contained in the reaction mixture, 15 parts of dimethyl sulfate is gradually added to the reaction mixture. The whole is stirred for another hour at 50° to 60° C., cooled and the dye having the formula:

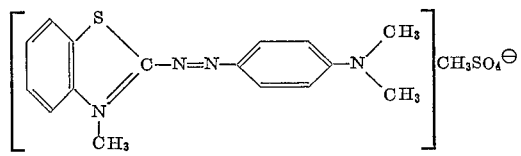

is isolated. It is a green black lustrous crystalline powder which dissolves with a blue coloration in water or alcohol and dyes polyacrylonitrile cloth blue shades from an acetic acid or sulfuric acid liquor. The dyeings thus obtained have excellent light fastness and wet fastness.

By using 24.5 parts of 2-ethoxy-4-diethylaminophenyl diazo cyanide or 27 parts of 2-ethoxy-4-diethylaminophenyl diazo formimino methyl ether instead of 17.4 parts of 4-dimethylaminophenyl azo cyanide, a violet dye having similar tinctorial properties is obtained.

EXAMPLE 4

25.2 parts of 4-phenylamino-2-methoxyphenyl diazo cyanide are introduced into a melt of 13 parts of 1,2-diaminobenzene at about 100° C. while stirring and the mixture is further stirred for fifteen minutes at 100° C. 200 parts of chloroform are added after the whole has been cooled, and 10 parts of magnesium oxide and 26 parts by volume of dimethyl sulfate are added to the mixture which contains the dye having the formula:

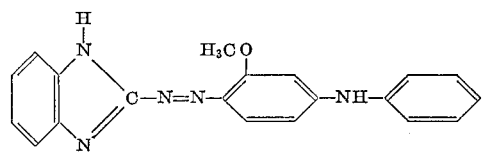

and the whole is stirred at 50° to 60° C. until methylation is completed. The chloroform is then distilled off with simultaneous addition of 200 parts of 5% hydrochloric acid. The mixture is cooled and the dye formed, which has the formula:

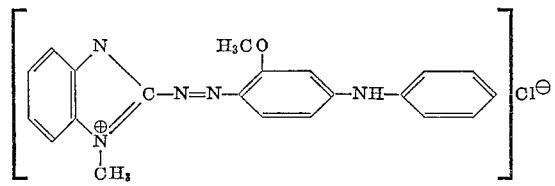

is suction filtered and dried. It is a dark powder which dissolves in alcohol or hot water giving a red violet coloration and dyes polyacrylonitrile cloth violet shades from an acetic acid or sulfuric acid liquor. The dyeings thus obtained have very good wet fastness and light fastness.

By using 14 parts of 4-methyl-1,2-diaminobenzene instead of 13 parts of 1,2-diaminobenzene and otherwise adopting the above procedure, a dye is obtained having similar tinctorial properties.

EXAMPLE 5

27.8 parts of orange 4-diethylamino-2-ethoxyphenyl azo formimino methyl ether having a melting point of 55° C. is introduced into a melt of 13 parts of 1,2-diaminobenzene a vigorous reaction thus taking place immediately. The mixture is stirred for a few minutes at 100° C., cooled, 100 parts by volume of chloroform are added and the whole is heated to 50° to 60° C. 10 parts of magnesium oxide and 26 parts by volume of dimethyl sulfate are added to the chloroform solution which contains the dye having the formula:

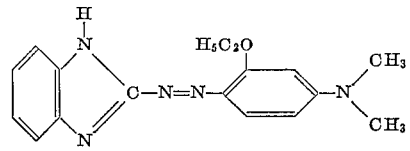

and the whole is stirred at 50° to 60° C. until methylation is completed; this may be determined for example by paper chromatography. The product is worked up as described in Example 1 and a dye is obtained which is identical with that obtained according to Example 1, paragraph 2.

By using 15.2 parts of 4-methoxy-1,2-diaminobenzene instead of 13 parts of 1,2-diaminobenzene, a dye is obtained having similar tinctorial properties.

EXAMPLE 6

16.1 parts of 4-methoxyphenyl diazo cyanide are introduced into a melt of 13 parts of 1,2-diaminobenzene while stirring and the whole is stirred for another ten minutes at 100° C. to complete the reaction. The whole is cooled and 100 parts by volume of chloroform, 10 parts of magnesium oxide and 26 parts by volume of dimethyl sulfate are added; the mixture, which contains the dye having the formula:

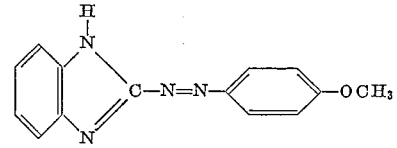

is heated at 50° to 60° C. and stirred until methylation is completed. It is then worked up as described in Example 1, paragraph 2. A brown dye having the formula:

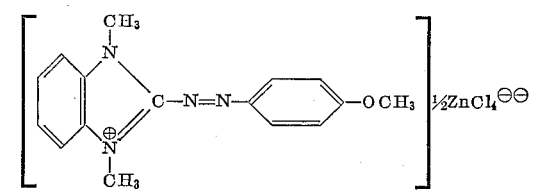

is obtained which dissolves in water with a yellow red color and dyes polyacrylonitrile cloth fast yellow shades from an acetic acid or sulfuric acid liquor.

By using 14 parts of 4-methyl-1,2-diaminobenzene or 17 parts of 4-chloro-1,2-diaminobenzene instead of 13 parts of 1,2-diaminobenzene, dyes having similar tinctorial properties are obtained.

EXAMPLE 7

19.1 parts of 2,4-dimethoxyphenyl azo cyanide are slowly added to a melt of 13 parts of 1,2-diaminobenzene while stirring. After evolution of heat has ceased, the whole is heated at 110° to 120° C. for another fifteen minutes. The whole is allowed to cool and 100 parts by volume of chloroform, 10 parts of magnesium oxide and 26 parts by volume of dimethyl sulfate are added and the mixture, which contains the dye having the formula:

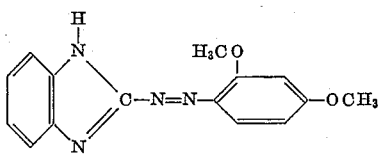

is heated at 50° to 60° C. while stirring until methylation is completed. The mixture is then worked up as described in Example 1, paragraph 2. A brown dye having the formula:

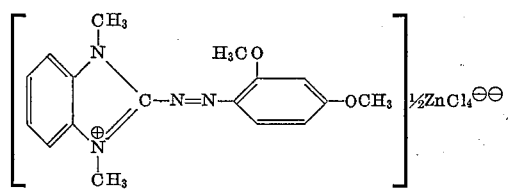

is obtained which dissolves in water with a red color and dyes polyacrylonitrile cloth fast orange shades from an acetic acid or sulfuric acid liquor.

By using 22.6 parts of 2,4-dimethoxy-5-chlorophenyl azo cyanide instead of 19.1 parts of 2,4-dimethoxyphenyl azo cyanide and following the above procedure, a dye having similar tinctorial properties is obtained.

EXAMPLE 8

18.8 parts of 4-acetylaminophenyl azo cyanide is introduced into a melt of 13 parts of 1,2-diaminobenzene, the temperature rising to 115° C. The whole is stirred at this temperature for another fifteen minutes, 100 parts by volume of o-dichlorobenzene is added and the whole allowed to cool while stirring. The condensation product having the formula:

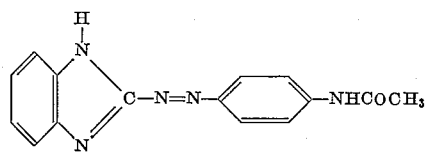

is suction filtered, washed with a little o-dichlorobenzene and then with carbon tetrachloride and dried. A brown powder is obtained which dissolves in dimethylformamide with a yellow color and dyes acetate or polyamide cloth fast yellow shades.

We claim:
1. A process for the production of a dye of the formula

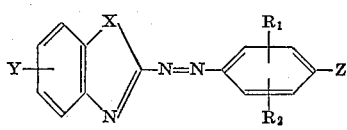

wherein
Y represents a member selected from the group consisting of hydrogen, chlorine, bromine, methyl, methoxy, ethoxy and acetylamino;
X represents a member selected from the class consisting of

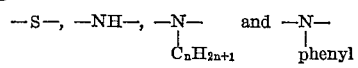

$n$ denoting an integer from 1 to 4;

$R_1$ represents a member selected from the group consisting of hydrogen, methyl, methoxy and ethoxy;
$R_2$ represents a member selected from the group consisting of hydrogen, chlorine and methoxy; and
Z represents a member selected from the group consisting of chlorine, bromine, methoxy, ethoxy, dimethylamino and diethylamino;
which process comprises reacting at 10° to 150° C. a compound of the formula

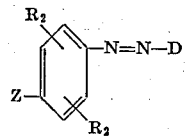

wherein
$R_1$, $R_2$ and Z have the same meanings as given above and D represents a member selected from the group consisting of

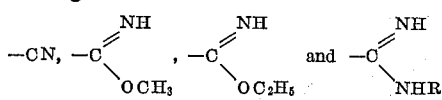

R denoting a radical of the benzene series, with a compound of the formula

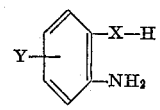

wherein X and Y have the same meanings as given above.

2. A process for the production of the dye of the formula

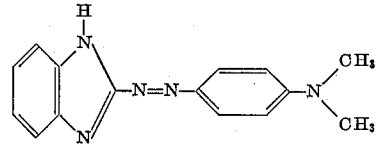

which comprises: condensing at 100° to 150° C. orthophenylenediamine with the compound of the formula

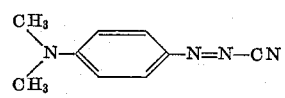

3. A process for the production of the dye of the formula

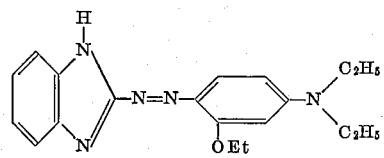

which comprises: condensing at 100° to 150° C. orthophenylenediamine with the compound of the formula

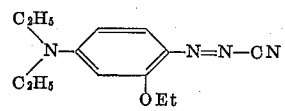

4. A process for the production of the dye of the formula

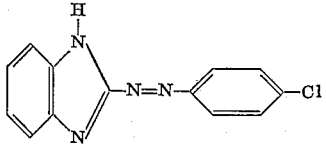

which comprises: condensing at 100° to 150° C. ortho-phenylenediamine with the compound of the formula

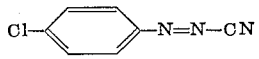

5. A process for the production of the dye of the formula

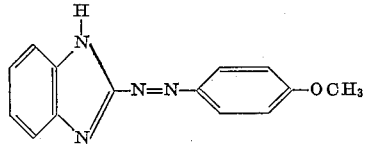

which comprises: condensing at 100° to 150° C. ortho-phenylenediamine with the compound of the formula

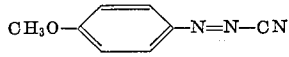

6. A process for the production of the dye of the formula

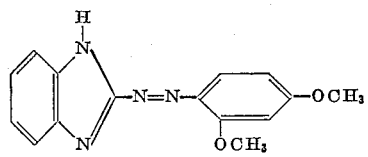

which comprises: condensing at 100° to 150° C. ortho-phenylenediamine with the compound of the formula

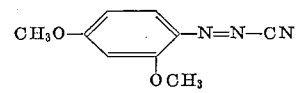

References Cited by the Examiner

UNITED STATES PATENTS

| | | | |
|---|---|---|---|
| 2,252,722 | 8/1941 | Miescher et al. | 260—309.6 |
| 2,252,723 | 8/1941 | Miescher et al. | 260—309.6 |
| 2,865,909 | 12/1958 | Straley et al. | 260—158 |
| 3,102,878 | 9/1963 | Baumann et al. | 260—146 |

OTHER REFERENCES

Morton: "The Chemistry of Heterocyclic Compounds," pages 381–382 (1946).

Pentimalli et al.: C. A., vol. 51, pages 10493–10494 (1957).

Shriner et al.: Chem. Rev., vol. 33, pages 409–410 (1944).

CHARLES B. PARKER, *Primary Examiner.*

FLOYD D. HIGEL, *Assistant Examiner.*